US00RE42230E

(19) United States
(12) Reissued Patent
Norin et al.

(10) Patent Number: US RE42,230 E
(45) Date of Reissued Patent: Mar. 22, 2011

(54) MALE ELECTRICAL CONNECTOR COMPONENT

(75) Inventors: Joakim Norin, Stockholm (SE); Tor Magnusson, Stockholm (SE)

(73) Assignee: CTEK Sweden AB, Vikmanshyttan (SE)

(21) Appl. No.: 29/353,934

(22) Filed: Jan. 15, 2010

Related U.S. Patent Documents

Reissue of:
(64) Patent No.: Des. 596,125
Issued: Jul. 14, 2009
Appl. No.: 29/317,232
Filed: Apr. 24, 2008

(30) Foreign Application Priority Data

Nov. 30, 2007 (EM) ..... 000835541-0001
Nov. 30, 2007 (EM) ..... 000835541-0002

(51) LOC (9) Cl. ..... 13-03
(52) U.S. Cl. ..... D13/133
(58) Field of Classification Search ..... D13/101, D13/107, 108, 110, 114, 118, 133, 146, 147, D13/153, 154, 199; 320/110–115; 362/427, 362/404, 406, 804, 287; 363/146; 336/92; 439/489, 502, 505, 578, 607–610, 623, 680, 439/686
See application file for complete search history.

(56) References Cited

U.S. PATENT DOCUMENTS

D321,503 S * 11/1991 Ditzig ..... D13/133
D487,147 S * 2/2004 Ellingboe et al. ..... D24/129
D516,032 S * 2/2006 Suckle et al. ..... D13/147
D520,459 S * 5/2006 Kent et al. ..... D13/156
D555,094 S * 11/2007 Victor ..... D13/133
D586,750 S * 2/2009 Li ..... D13/133

* cited by examiner

*Primary Examiner*—Thomas J Johannes
(74) *Attorney, Agent, or Firm*—Foley & Lardner LLP

(57) CLAIM

We claim the ornamental design for male electrical connector component, as shown and described.

DESCRIPTION

Figure 1:
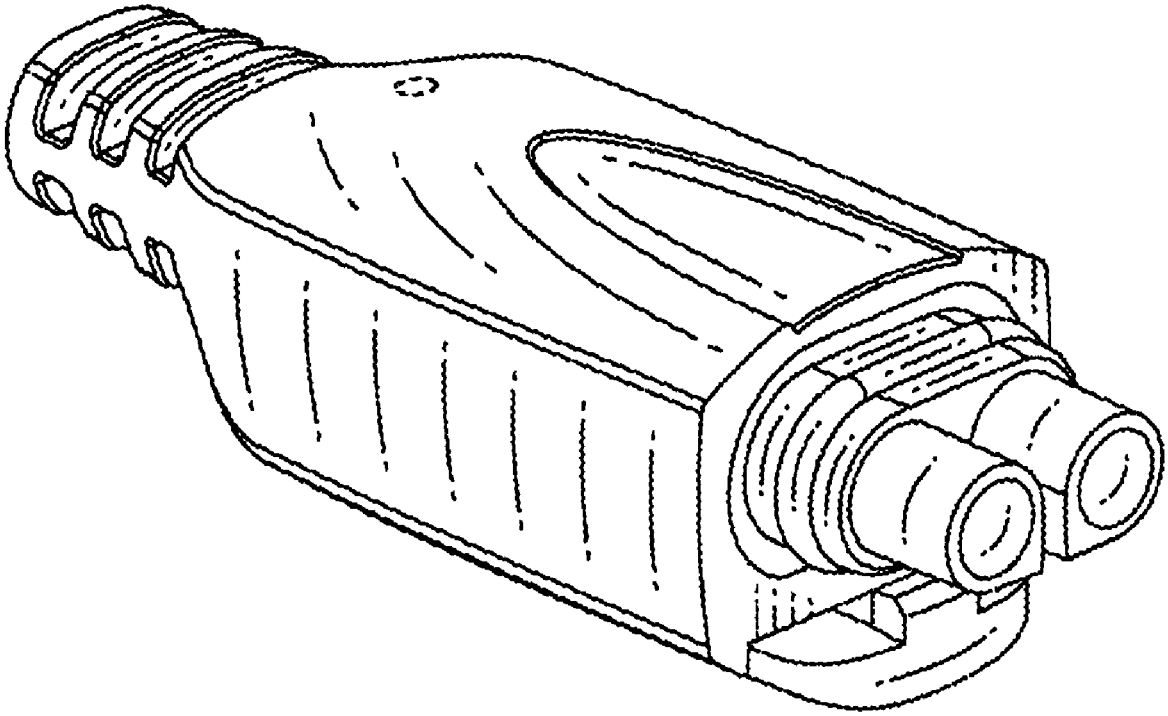
Figure 2:
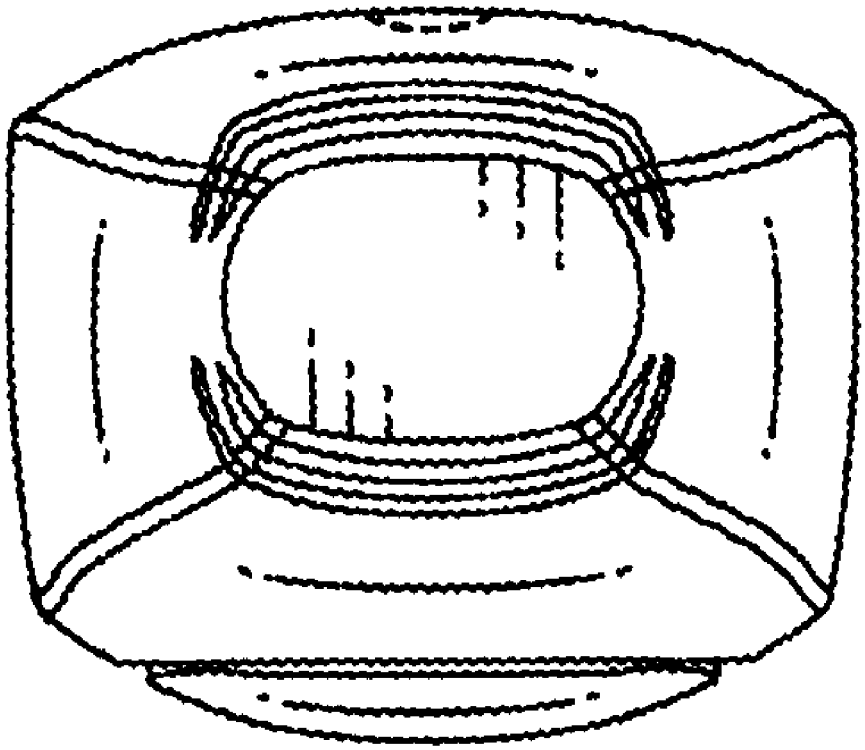
Figure 3:
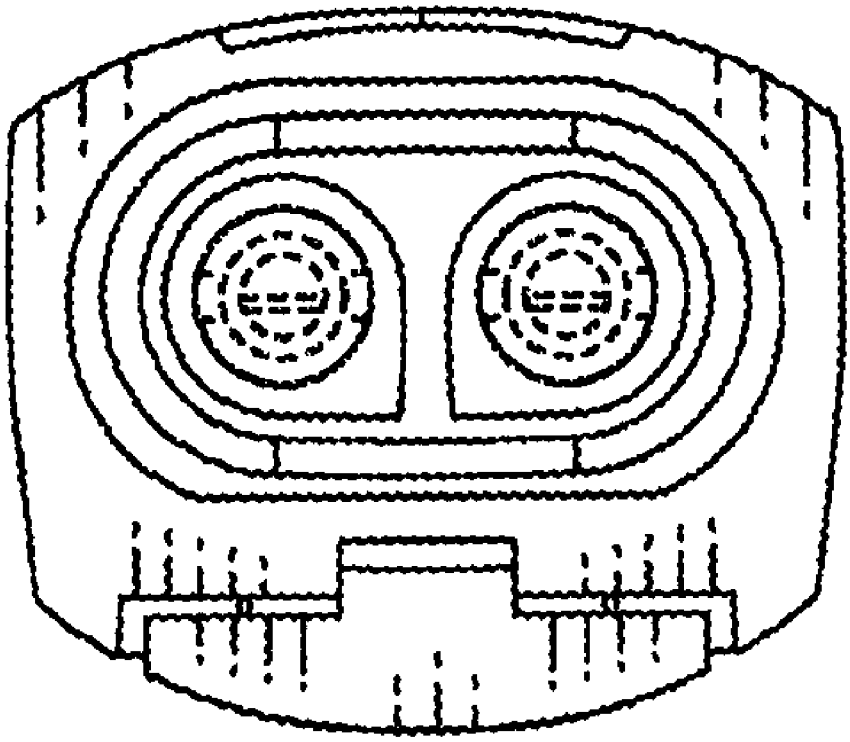
Figure 4:
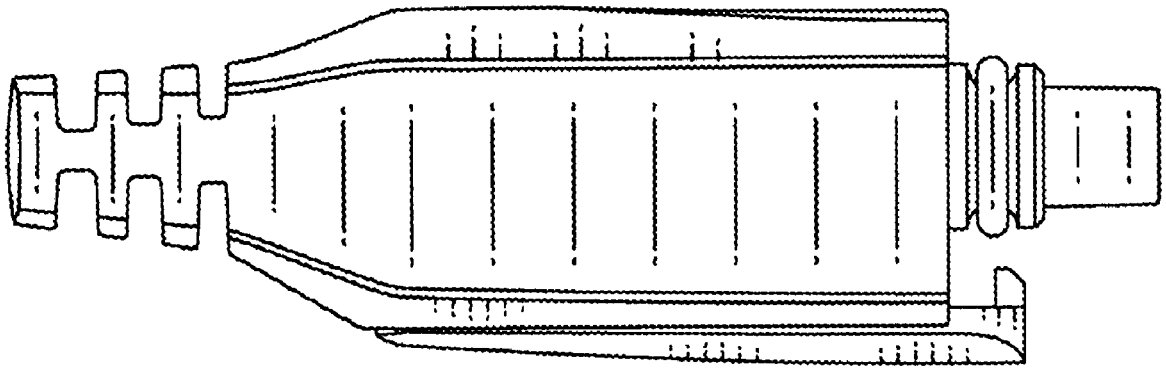
Figure 5:
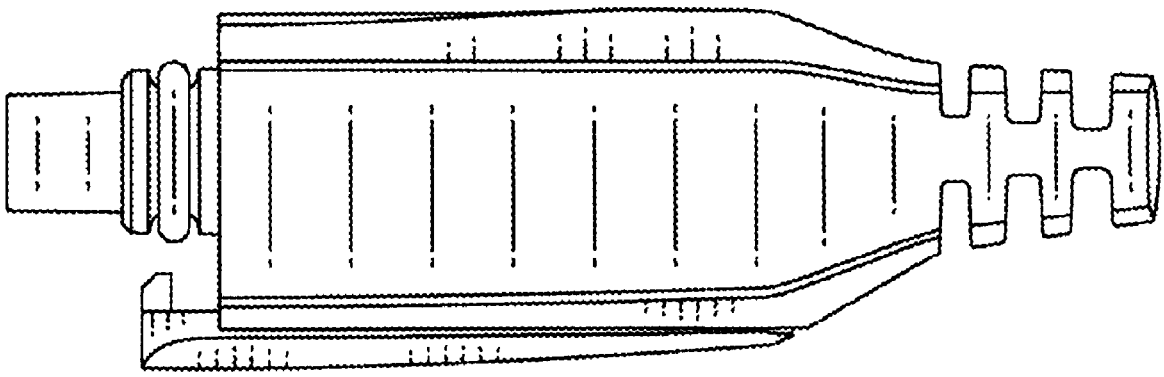
Figure 6:
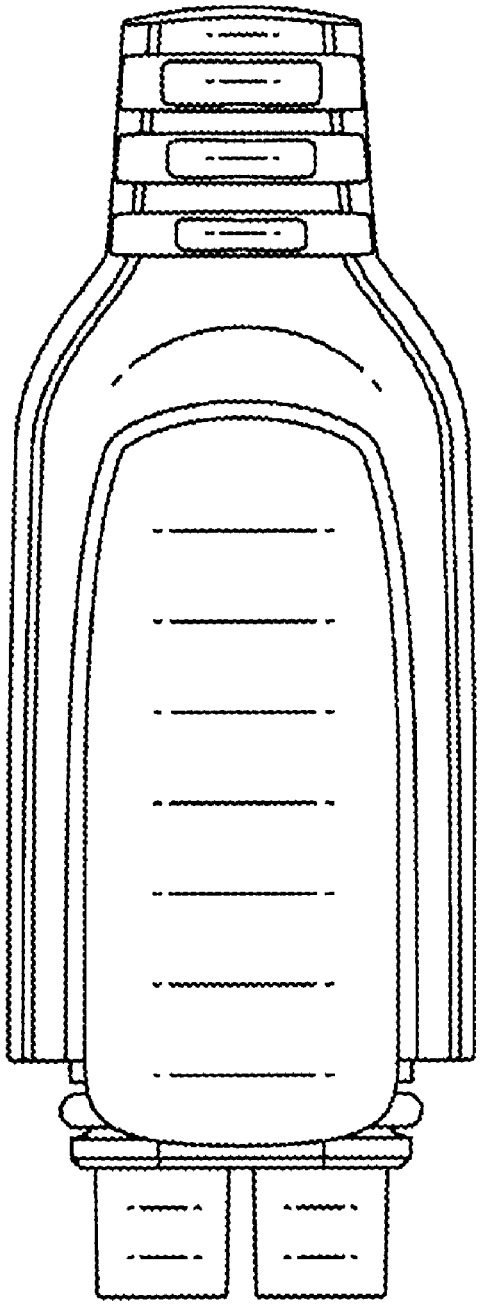
Figure 7:
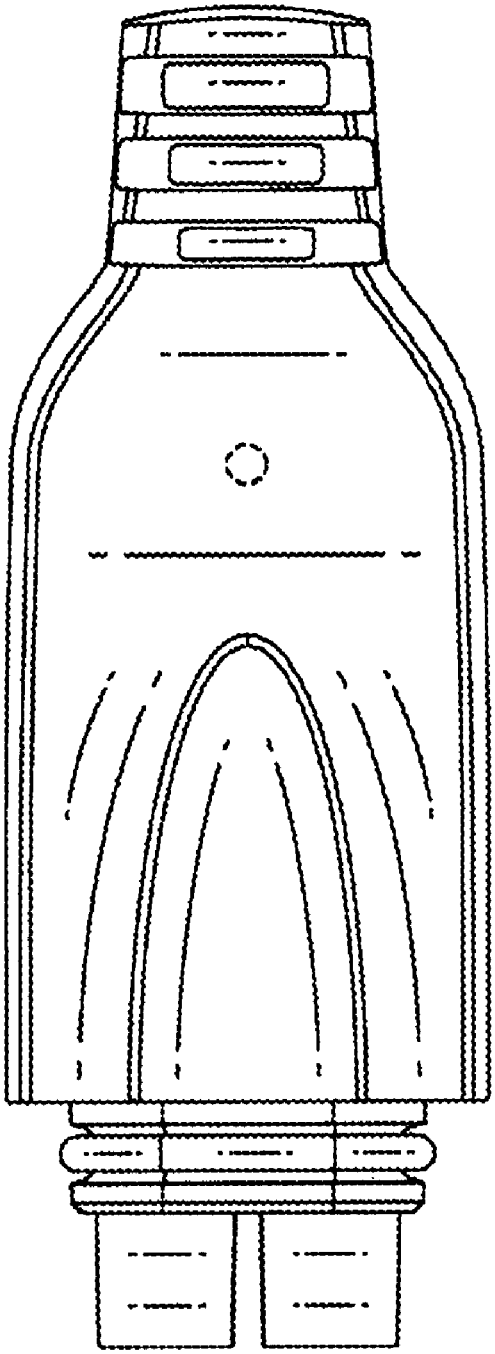
Figure 8:
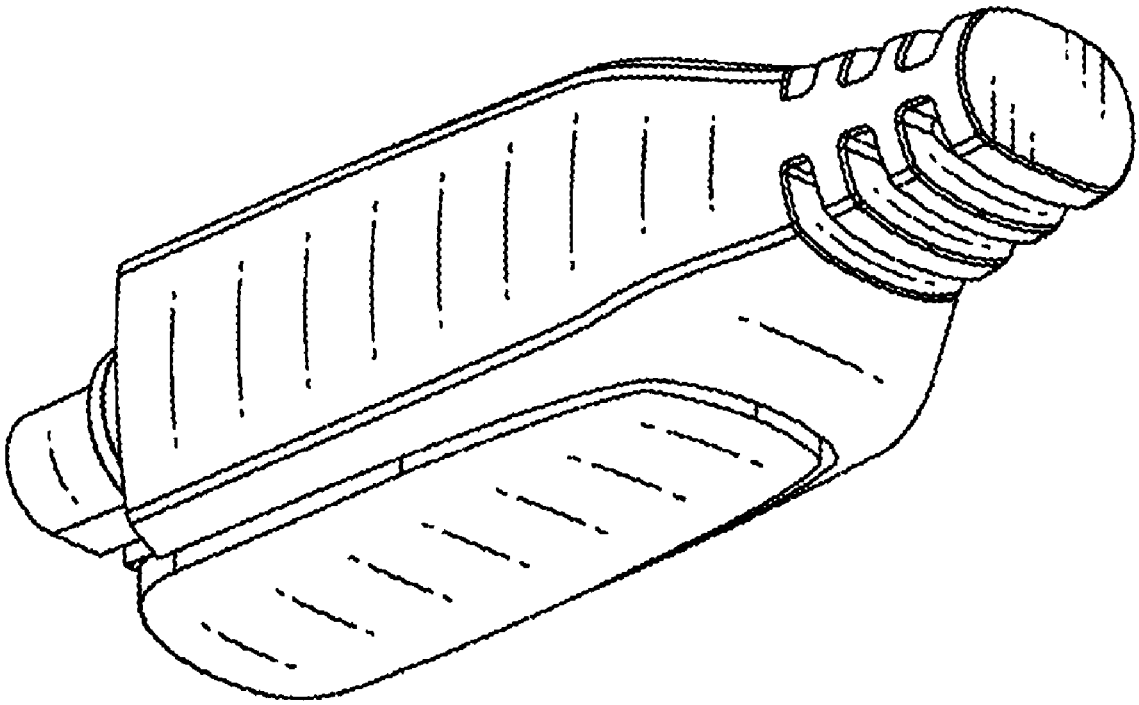

FIG. 1 is a front, top, left-sided perspective view of a male electrical connector component showing our new design;
FIG. 2 is a rear view thereof;
FIG. 3 is a front view thereof;
FIG. 4 is a left side view thereof;
FIG. 5 is a right side view thereof;
FIG. 6 is a bottom view thereof;
FIG. 7 is a top view thereof; and,
FIG. 8 is a bottom, rear, right-side view thereof.
The broken line portion of the figure drawings is included to show unclaimed subject matter only and forms no part of the claimed design.

1 Claim, 8 Drawing Sheets

Matter enclosed in heavy brackets [ ] appears in the original patent, but forms no part of this reissue; matter printed in italics indicates the additions made by reissue.